Feb. 14, 1956 R. PILKINGTON 2,734,330
LAWN EDGER ATTACHMENT FOR A LAWN MOWER
Filed Dec. 28, 1953

INVENTOR.
RICHARD PILKINGTON
BY R. W. Hodgson

United States Patent Office 2,734,330
Patented Feb. 14, 1956

2,734,330
LAWN EDGER ATTACHMENT FOR A LAWN MOWER

Richard Pilkington, Burbank, Calif.

Application December 28, 1953, Serial No. 400,693

5 Claims. (Cl. 56—251)

Generally speaking, the present invention relates to the lawn mowing and edging art and, more particularly, it pertains to an improved lawn edger attachment for a conventional lawn mower, which can be easily and rapidly attached to a conventional lawn mower and normally carried in inoperative position when the mower is being used for lawn mowing purposes, but which can be rapidly and easily brought into operative position for lawn edging use by merely reversing the position of the lawn mower handle with respect to the underlying lawn.

I am aware of the fact that several prior art lawn edging attachments for lawn mowers have been developed heretofore. However, all of such prior art devices known to me have serious disadvantages of one type or another.

For example, most such prior art devices, since they are attachments and are not integral with the mower, are not arranged for rigid, effective force-transmission relationship with respect to the lawn mower. In other words, they are so arranged as to be virtually inoperative for lawn edging purposes because of instability and "wobble" of the cutting blade (and general instability). This instability is even further accentuated in certain prior art structures because of lack of multiple point (in-line) or suspension connection of the attachment with respect to the lawn mower frame.

Another disadvantage of such prior art structures, known to me, is their incapability of attachment to lawn mowers of different sizes and shapes having horizontal tie rods and/or yokes of different sizes and shapes.

Furthermore, most such prior art devices known to me have not been provided with depth-of-cut limiting means adapted to limit the maximum depth to which the cutting blade of the edger will penetrate, thus frequently leading to a difficult edging operation (because of excessive depth-of-cut) and/or to an edging operation producing a lawn edge of unsightly, irregular contour (because of variations in the depth-of-cut).

Furthermore, most such prior art devices known to me have unidirectionally rotatably lawn edge cutting means, thus making it impossible to reverse the direction of movement of the device to allow a repeated back-and-forth edging operation, as is frequently necessary when thick or tough turf is encountered.

Generally speaking, one basic form of the present invention includes attachment yoke means having a base portion and two laterally spaced, virtually parallel side arms, which rotatably mount (usually by lateral pivotal connection means) rotatable, circular cutting blade means therebetween (usually equi-distant therebetween and virtually parallel with respect to said side arms). The base portion of the attachment yoke means is provided with an extension virtually perpendicular to an imaginary axis of rotation extending through the rotatable cutting blade means and the side arms of the attachment yoke means (also, usually coaxial with the pivotal connection means). The extension is provided with selectively engageable clamping means at the end thereof remote from said base portion of said attachment yoke means and cooperable to be selectively clamped around the customary horizontal tie rod of a conventional lawn mower. Longitudinal linkage means is pivotally connected at one end with respect to the base portion of the attachment yoke means and is provided at the other end with position-adjustable and size-adjustable selectively engageable clamp means adaptable to engage one of the customary flat, curved arms comprising the yoke of a lawn mower whereby to firmly attach the circular cutting blade means in an upstanding position virtually parallel to the lawn mower's wheels in a manner such that swinging the lawn mower on its wheels into normally inoperative position for lawn mowing purposes will move the rotatable circular cutting blade means into operative relationship for effectively edging a lawn.

In one preferred embodiment of the present invention, the extension and the clamping means carried thereby, and the linkage means and the clamp means carried thereby are so connected with respect to the base portion, in centered alignment with the cutting blade means, that force applied therethrough to the cutting blade means, during operation of the device, will lie in the plane of the cutting blade means, whereby to eliminate "wobble."

Also one preferred form of the present invention may include depth-of-cut limiting means comprising coaxial laterally extending hub means adjacent the cutting blade means and of a radius less than that of the cutting blade means by a predetermined amount equal to the desired maximum depth-of-cut.

Also, one preferred form of the present invention, may mount the circular cutting blade means for bidirectional rotation with respect to the side arms of the attachment yoke means whereby the device is reversibly operable to facilitate a lawn edging operation.

From the above description of a basic and several preferred generic forms of the present invention, it will be obvious to those skilled in the art that virtually all of the above-mentioned prior art disadvantages are virtually entirely eliminated and overcome in and through use of the lawn edger attachment of the present invention.

For example, because of its symmetrical, in-line relationship with respect to the line of force application and the plane of the cutting blade, no "wobble" of said cutting blade will occur. Furthermore, the two point suspension or connection of the present invention, while adjustable to almost any size or shape of lawn mower, provides an extremely stable and strong attachment means for the cutting blade means, thus eliminating prior art instability and adjustment inadequacy.

The depth-of-cut limiting means of the present invention makes the lawn edging operation uniform and of a nature such as to require a minimum expenditure of energy.

With the above points in mind, it is the object of the present invention to provide a new and improved lawn edger attachment for a lawn mower capable of adjustment for attachment to lawn mowers of different sizes and shapes and so arranged structurally, and with respect to the line or plane of force application, as to virtually eliminate instability and "wobble."

It is a further object of the present invention to provide a device of the character set forth in the preceding object, which is additionally provided with depth-of-cut limiting means adapted to produce a uniform lawn edging operation.

Other and allied objects will be apparent to those skilled in the art after a careful perusal of the accompanying illustrations, the present specification and the appended claims.

To facilitate understanding, reference will be made to the hereinbelow-described drawings, in which.

Figure 4:
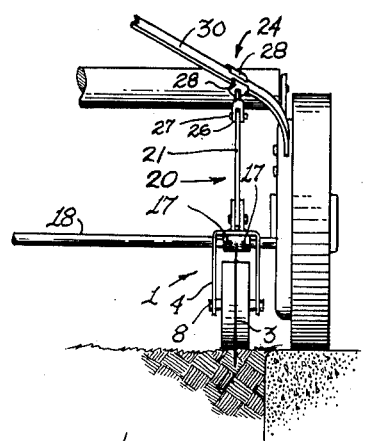
Fig. 4 is an enlarged fragmentary elevational view taken in the direction of the arrows IV—IV in Fig. 2, and illustrates the operation of the device with respect to a lawn edge and sidewalk (or curb) edge.
Figure 5:
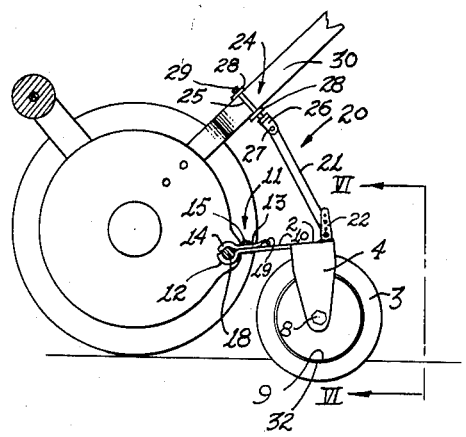
Fig. 5 is a vertical sectional view taken in the direction of the arrows V—V in Fig. 3, with certain parts omitted for clarity.
Figure 3:
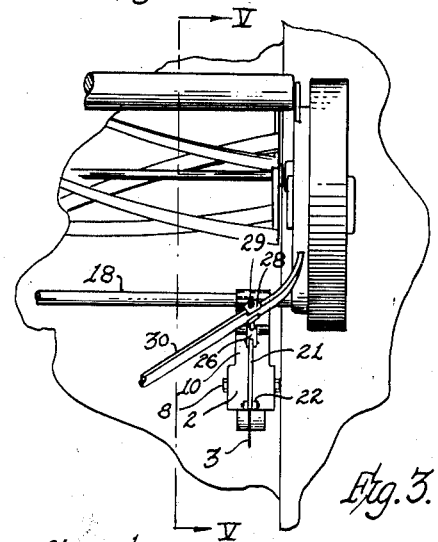
Fig. 3 is an enlarged fragmentary top plan view of Fig. 2.
Figure 6:
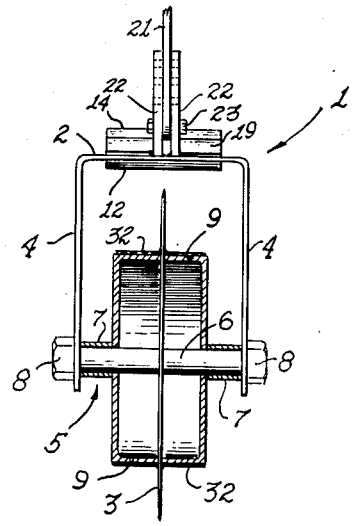
Fig. 6 is an enlarged elevational view taken in the direction of the arrows VI—VI in Fig. 5 (except that the two hubs 9 and the two spacing washers 7 are shown in vertical section).

Generally speaking, the present invention includes attachment yoke means having a base portion and two lateral spaced, virtually parallel side arms, which rotatably mount circular cutting blade means therebetween. The base portion of the attachment yoke means is provided with an extension virtually perpendicular to an imaginary axis of rotation extending through the rotatable cutting blade means and side arms of the attachment yoke means. The extension is provided with selectively engageable clamping means at the end thereof remote from said base portion of said attachment yoke means and cooperable to be selectively clamped around the customary horizontal tie rod of a conventional lawn mower.

In the specific example illustrated, the attachment yoke means is indicated generally at 1, the base portion is indicated at 2, and the side arms are indicated at 4. In the form illustrated, the rotatable cutting blade means is of disc-like form, as indicated at 3, and is rotatably mounted parallel to and equi-distant between the parallel side arms 4 of the yoke 1 by lateral or horizontal pivotal connection means, indicated generally at 5, and comprising a horizontal shaft 6 carrying spacing washers 7 on the insides of the side arms 4 and locking nuts 8 on the outsides of the side arms 4. The cutting blade 3 is also provided with coaxial hubs 9, the purpose of which will be explained more fully hereinafter.

In the specific example illustrated, the above-referred to extension carried by the base portion 2 is indicated at 10 and the selectively engageable clamping means carried thereby is indicated generally at 11 and comprises a first lower, upwardly concave clamping element 12 integral with the extension 10, and a second upper clamping member 13 having a downwardly concave clamping element 14 non-integral with respect to extension 10 but adapted to be fastened with respect thereto by threaded fastening means 15 extending through holes in said upper clamping member 13 into threaded engagement with tapped holes 17 in the extension 10. The arrangement is such that the upper clamping element 14 and the lower clamping element 12 can be effectively engaged around a conventional horizontal tie rod 18 of a lawn mower.

In the specific example illustrated, the clamping member 13 includes a second clamping element 19 of different size from the clamping element 14 and integrally formed with the clamping member 13. The arrangement is such that the position of the clamping elements 14 and 19 can be selectively interchanged to make it possible to effectively engage different tie rods (such as the tie rod 18) of different sizes.

Also, generally speaking, longitudinal linkage means is pivotally connected at one end with respect to the base portion of the attachment yoke means and is provided at the other end with position-adjustable and size-adjustable selectively engageable clamp means adapted to engage one of the customary flat curved arms comprising the yoke of a lawn mower.

In the specific example illustrated, this longitudinal linkage means is indicated generally at 20 and comprises a member 21 pivotally connected at one end with respect to the base portion 19 by adjustable connection means comprising an upstanding multiply-apertured split post 22 fastened to the base portion 2, and by suitable bolt means 23 passing through aligned apertures in said split post 22 and in the end of the longitudinal member 21. In the specific example illustrated, the size-adjustable and position-adjustable clamp means carried by the linkage means 20 is indicated generally at 24 and comprises a member 25 pivotally connected by apertured yoke means 26 and bolt means 27 to the apertured end of the longitudinal member 21; said member 25 also carrying thereon apertured opposed clamp jaw members 28 and a nut 29 threaded on the outer end of the member 25. It should be noted that the member 25 rotates about the bolt 27 which is virtually parallel with the bolt 23 and to the shaft 6, and that the clamp jaws 28 are capable of both sliding movement along the member 25 or rotation therearound, thus making it possible to fasten said jaws around one of the conventional flat curved arms 30, comprising the yoke of a lawn mower, and to do this virtually irrespective of the size, shape, position or angle of inclination thereof.

Figure 1:
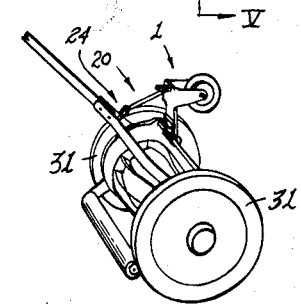
Fig. 1 is a reduced-size, perspective view of one illustrative form of the present invention shown attached to a conventional lawn mower, which is in the customary lawn mowing position—therefore, maintaining the device of the present invention in inoperative position.
Figure 2:
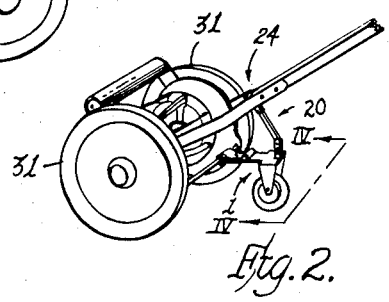
Fig. 2 is a reduced-size, perspective view showing the apparatus illustrated in Fig. 1 with the lawn mower handle reversed thus placing the lawn mower in a non-mowing position but placing the device of the present invention in operative lawn edging position.

The clamping means 13 at the end of the extension 10 and the clamp means 24 at the end of the linkage member 20 make it possible to attach the entire device to a conventional lawn mower in a firm, rigid, upstanding position such as shown in Fig. 1, virtually parallel to the lawn mower's wheels 31 in a manner such that swinging the lawn mower on its wheels 31 into the normally inoperative position for lawn mowing purposes shown in Fig. 2 will move the rotatable circular cutting blade 3 into operative relationship for effectively edging a lawn.

It should be noted that the extension 10 and the clamping means 13 carried thereby, and the linkage means 20 and the clamp means 24 carried thereby are so connected with respect to the base portion 2 in centered alignment with the cutting blade 3, that force applied therethrough to said cutting blade during operation of the device will lie in the plane of said cutting blade. This will virtually eliminate "wobble" and other undesirable side movement effects frequently encountered in prior art edging attachments.

Also, generally speaking, the device of the present invention may be provided with depth-of-cut limiting means comprising coaxial laterally extending hub means adjacent the cutting blade means and of a radius less than that of the cutting blade means by a predetermined amount equal to the desired maximum depth-of-cut. In the specific example illustrated, this takes the form of the two hubs 9 each carrying a flat rubber tire 32 around its periphery. As illustrated in Fig. 4, one of these tires 32 is adapted to rest upon and engage an edge 33 of a sidewalk, or the like, adjacent an edge 34 of a grass lawn, or the like, so as to limit the depth to which the blade 3 can penetrate during the lawn edging operation.

It should also be noted that the cutting blade 3 is mounted for bidirectional rotation, thus making it possible to perform a back-and-forth lawn edging operation, when desired.

It should also be noted that the adjustable connection post 22 has a plurality of aligned apertures therethrough to allow the apertured end of the longitudinal member 21 to be connected with respect thereto in any of several different locations. This is to facilitate attachment of the device to lawn mowers of different sizes and shapes.

Numerous modifications and variations of the present invention will occur to those skilled in the art after a careful study hereof. Also such properly within the basic spirit and scope of the present invention are intended to be included and comprehended herein as fully as if specifically described, illustrated and claimed herein.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A lawn edger attachment for a lawn mower comprising: attachment yoke means including a base portion and two laterally spaced, virtually parallel side arms; rotatable disc-like cutting blade means, and laterally directed pivotal connection means effectively rotatably mounting said cutting blade means in symmetrical virtually parallel virtually equi-distant relationship between said side arms of said attachment yoke means, said base portion of said attachment yoke means being provided with an extension virtually perpendicular with respect to said pivotal connection means and to an imaginary extended radius of said cutting blade means and virtually centrally symmetrical with respect to an imaginary plane in which said cutting blade means lies, said extension being provided with selectively engageable clamping means at the end thereof remote from said base portion of said attachment yoke means and cooperable to be selectively clamped around the customary horizontal tie rod of a conventional lawn mower; longitudinal linkage means rotatably connected at one end, about an axis virtually parallel to said pivotal connection means, with respect to said base portion of said attachment yoke means and provided at the other end with clamp means size-adjustable along the length of said linkage means and pivotally position-adjustable around an axis virtually parallel to said pivotal connection means and around an axis virtually perpendicular thereto, said clamp means being selectively engageable with one of the customary flat curved arms comprising the yoke of a lawn mower, whereby to firmly attach the rotatable disc-like cutting blade means in an upstanding position virtually parallel to the lawn mower's wheels in a manner such that swinging the lawn mower on its wheels into normally inoperative position for lawn mowing purposes will move the rotatable cutting blade means into operative relationship for effectively edging a lawn; said extension, and clamping means carried thereby and said linkage means and clamp means carried thereby being so connected with respect to the base portion in centered alignment with the cutting blade means that force applied therethrough to the cutting blade means during operation of the device will lie in the plane of the cutting blade means.

2. A device of the character defined in claim 1 wherein the rotatable disc-like cutting blade means is provided with depth-of-cut limiting means comprising a coaxial laterally extending hub on each side of the cutting blade means and each having a similar radius less than that of the cutting blade means by a predetermined amount equal to the desired maximum depth-of-cut.

3. A device of the character defined in claim 2 wherein the pivotal connection means bidirectionally rotatably mounts the disc-like cutting blade means equi-distant between the side arms of the attachment yoke means whereby the device is reversibly operable to make possible a more effective lawn edging operation.

4. A device of the character defined in claim 3 including adjustable connection means carried by the base portion for effectively rotatably connecting the end of the longitudinal linkage means with respect to said base portion, said adjustable connection means comprising an upstanding multiply apertured connection post carried by the said base portion virtually in the plane of the cutting blade means.

5. A device of the character defined in claim 4 wherein the clamping means carried by the extension of the base portion includes a clamping member having selectively interchangeable clamping elements of different size integrally formed in said clamping member.

References Cited in the file of this patent

UNITED STATES PATENTS

| | | |
|---|---|---|
| 1,000,028 | Lindsey | Aug. 8, 1911 |
| 1,720,169 | Cripe | July 9, 1929 |
| 1,770,434 | Schleicher | July 15, 1930 |
| 2,075,301 | Pipenhagen | Mar. 30, 1937 |
| 2,158,580 | Houser | May 16, 1939 |